(12) United States Patent
Pare et al.

(10) Patent No.: US 7,357,382 B2
(45) Date of Patent: Apr. 15, 2008

(54) HYDRAULIC LOAD CENTERING SPRING PERCH

(75) Inventors: Richard Pare, Speedway, IN (US); Robert Stone, Delphi, IN (US); Ron Orr, Logansport, IN (US)

(73) Assignee: Matthew Warren, Inc., Logansport, IN (US)

( * ) Notice: Subject to any disclaimer, the term of this patent is extended or adjusted under 35 U.S.C. 154(b) by 221 days.

(21) Appl. No.: 11/255,549

(22) Filed: Oct. 21, 2005

(65) Prior Publication Data

US 2006/0038332 A1  Feb. 23, 2006

Related U.S. Application Data

(63) Continuation-in-part of application No. 10/205,163, filed on Jul. 25, 2002, now abandoned.

(60) Provisional application No. 60/307,767, filed on Jul. 25, 2001.

(51) Int. Cl.
*F16F 11/00* (2006.01)
(52) U.S. Cl. .................. 267/220; 267/179
(58) Field of Classification Search .......... 188/321.11; 267/221, 223, 226, 34, 140.11, 140.13, 179, 267/220
See application file for complete search history.

(56) References Cited

U.S. PATENT DOCUMENTS

| | | |
|---|---|---|
| 3,717,354 A | 2/1973 | Ritter |
| 4,397,452 A | 8/1983 | Fouts |
| 4,465,296 A | 8/1984 | Shiratori et al. |
| 4,771,989 A | 9/1988 | Smith |
| 4,773,635 A | 9/1988 | Buma |
| 4,993,376 A | 2/1991 | Fukutome et al. |
| 5,064,176 A * | 11/1991 | Goto ............... 267/140.11 |
| 5,265,902 A | 11/1993 | Lewis |
| 5,375,870 A | 12/1994 | Smith et al. |
| 5,544,725 A | 8/1996 | Handke et al. |
| 5,775,720 A | 7/1998 | Kmiec et al. |
| 6,126,155 A | 10/2000 | Smith et al. |
| 6,149,171 A | 11/2000 | Bono et al. |
| 6,155,543 A | 12/2000 | Solomond et al. |

(Continued)

FOREIGN PATENT DOCUMENTS

DE            833745         *  9/1949

(Continued)

OTHER PUBLICATIONS

Edara, Ramesh and Shih, Shan, Effective Use of Multibody Dynamics Stimulation in Vehicle Suspension System Development, SAE Technical Paper Series, Mar. 8-11, 2004, 8 pgs., Detroit.

(Continued)

*Primary Examiner*—Chris Schwartz
(74) *Attorney, Agent, or Firm*—Woodard Emhardt Moriarty McNett & Henry LLP (57) ABSTRACT

A spring perch assembly for automatically centering a load applied to a spring is provided. The assembly includes a body portion and a base portion which when engaged may tilt relative to one another. When disposed between a spring and an applied load, the assembly automatically centers the load along the spring's natural centerline.

16 Claims, 8 Drawing Sheets

U.S. PATENT DOCUMENTS

| | | | |
|---|---|---|---|
| 6,217,012 B1 | 4/2001 | Hashirayama | |
| 6,328,290 B1 | 12/2001 | Imaizumi et al. | |
| 2001/0035601 A1 | 11/2001 | Imaizumi et al. | |
| 2002/0145242 A1* | 10/2002 | Miyamoto et al. | 267/220 |
| 2007/0131501 A1* | 6/2007 | Fader et al. | 188/321.11 |

FOREIGN PATENT DOCUMENTS

| | | |
|---|---|---|
| EP | 0 526 689 | 2/1993 |
| JP | 2001-140964 | 5/2001 |

OTHER PUBLICATIONS

Suzuki, Satoshi, Kamlya, Syuji, and Imaizumi, Toshlyuki, Approaches to Minimizing Side Force of Helical Coil Springs for Riding Comfort, Society of Automotive Engineers, Inc., 1995, 8 pgs.

Gotoh, Takashi and Imaizumi, Toshlyuki, Optimization of Force Action Line with New Spring Design on the Macpherson Strut Suspension for Riding Comfort.

* cited by examiner

Fig. 1

(PRIOR ART)

Fig. 2

(PRIOR ART)

HYDRAULIC LOAD CENTERING SPRING PERCH

This application is a continuation-in-part of application Ser. No. 10/205,163, filed Jul. 25, 2002 now abandoned, which claims priority to and incorporates by reference U.S. Provisional Application Ser. No. 60/307,767 filed Jul. 25, 2001.

FIELD OF THE INVENTION

The present invention relates generally to an improved device and method for centering the reactive loads of a spring.

BACKGROUND OF THE INVENTION

Three basic types of coil compression springs are known in the industry. An open end spring consists of a wire coil which generally follows a single helix angle to the end of the wire. An unground, closed end spring has an end which touches the last coil of the spring. In a ground, closed end spring, the tip of the final coil is shaped by grinding such that when the end surface of the tip touches the last active coil of the spring, a flat upper surface is produced. Most standard automotive springs are open end springs as they are relatively inexpensive to produce. In contrast, most high-performance springs used in racecars are ground, closed end springs.

As a fixed plane of contact load is applied to compress a coil spring, as is typical in the majority of springing systems, the spring reactive force is not distributed evenly across the face of the spring. Where this load concentration occurs on the spring varies with the type of spring used. For example, in an open end spring the load is concentrated between the end of the spring and the point at which the load ceases contact with the spring. As the load is increased, this point moves away from the end tip of the spring. In unground closed end springs, the load is concentrated primarily near the end tip. In ground, closed end springs, the load concentration is generally at the first point of active coil contact with the surface of the fixed plane of contact load. The consequences of this uneven loading are illustrated in lateral or offset spring reactive forces such as in vehicle suspension systems. In general, a racing vehicle suspension system is provided with a helical compression spring designed to provide a coil axis that coincides with the direction and axis of the applied load. The most common system employs a spring that is fitted around the body of a shock absorber such that the central axis of the spring substantially coincides with the central axis of the shock absorber. The resultant offset of the spring reactive loads to the fixed-plane-of-contact vehicle loads produce a bending moment in the shock absorber, increasing internal frictions within the shock absorber that degrade the vehicles performance. In a strut-type suspension system, such as is common in street vehicles, a shock absorber is employed as a strut for positioning the vehicle's wheels. If there is a displacement between the load axis and the spring reactive force axis, a bending moment is exerted on the strut, degrading its ability to act smoothly in absorbing road surface inputs. This lateral force may prevent the piston from sliding smoothly in the guide to act as a shock absorber. For this reason, strut systems commonly employ springs that are purposely offset from the axis of the strut such that the spring reactive forces substantially coincides with the vehicle load axis.

In order for the reactive force developed within a spring to remain substantially at the spring's natural center axis, the applied load and reactive forces must be allowed to spread themselves equally over the full face of the spring end coil. It can only do so if the contact plane thru which the load is applied is allowed to pivot, or tilt, as demanded by the twisting stiffness of the spring end coil. If the load is applied through a fixed-planar surface, the load and therefore the reactive force will always be concentrated away from the spring natural center axis.

Figure 1:
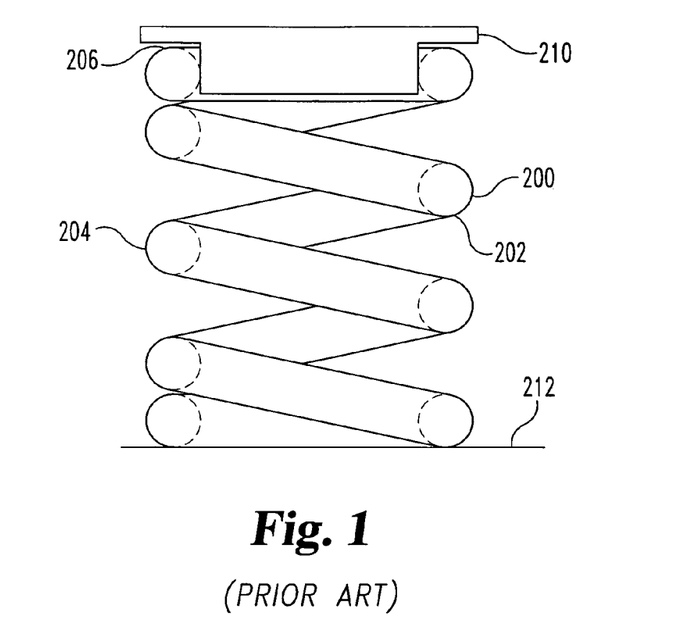
FIG. 1 is a side view of a coil spring according to the prior art in an unloaded state.
Figure 2:
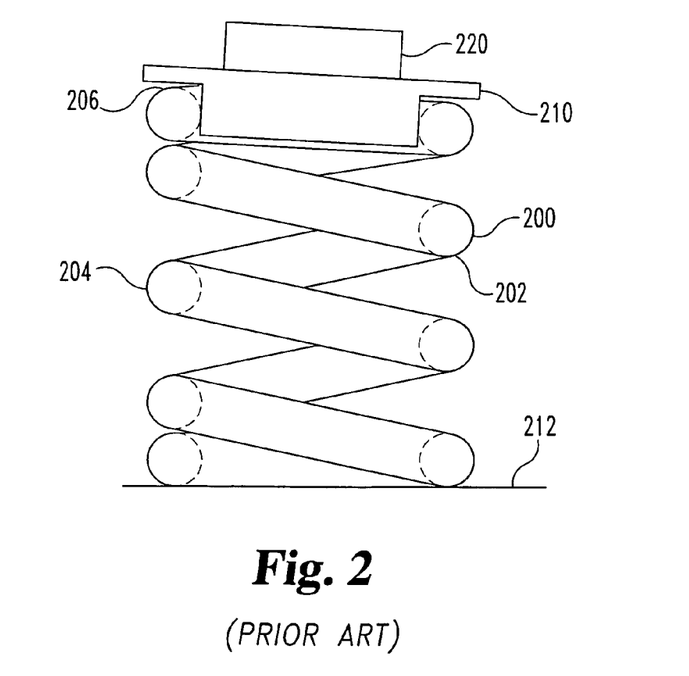
FIG. 2 is a side view of a coil spring according to the prior art in a loaded state.

This problem is illustrated in FIGS. 1-2. A traditional closed-end coil spring 200 having a load-bearing platform 210 at one end is shown in an unloaded state in FIG. 1 disposed against a base 212. In the unloaded state, the first side of the spring 202 is substantially equal in height to the second side of the spring 204. In this example, the point of first contact 206 between the spring 200 and the platform 210 is on the second side of the spring 204.

When a load 220 is applied to the spring 200, the spring is compressed as shown in FIG. 2. As the load is applied, the load is initially resisted at the first point of active coil contact 206, as the load settles and stays in full contact with platform 210, the platform deflects downward on the first side of the spring 202, pivoting around the center axis of the wire at the first point of contact 206. The degree of pivot or tilt is dependent on the twisting stiffness of the wire. As a result, the first side of the spring 202 is compressed to a greater degree than the second side of the spring 204. When a load is applied thru a fixed plane of contact, the resultant spring reactive forces are offset away from the spring natural centerline, resulting in a bending moment applied to the spring assembly. This bending moment is usually undesirable and may result in unanticipated or degraded performance or premature wear of the final spring assembly. Typically this problem has been compensated for by using larger and heavier springs in the context of vehicle suspension systems.

Accordingly, there is a need for a device which assists in centering the reactive loads in a coil spring, preferably allowing the load to be concentrated at the centerline of the spring. In the context of vehicle suspension systems, preferably such a device is lighter and more efficient than current devices. Prior attempts to solve these problems have been unsuccessful. The present invention addresses these concerns.

SUMMARY OF THE INVENTION

The invention is set forth in the claims below, and the following is not in any way to limit, define or otherwise establish the scope of legal protection. In general terms, the present invention relates to an assembly for automatically centering the load applied to a spring.

One preferred embodiment provides a load-centering perch assembly engaging the end coil of a coil spring. The assembly includes a base member engaged with the end coil of a coil spring having a natural centerline, wherein the base member is tiltable with the end coil relative to the natural centerline of the spring during spring compression. The assembly also includes a body member for receiving a load having a substantially fixed load direction, wherein the body member is in substantially fixed alignment with the load. The body member and the base member are pivotally engaged; and, during spring compression the base member tilts with the spring end coil relative to the spring natural centerline and pivots with respect to the body member to redistribute the applied load across the spring end coil.

An alternate embodiment of the present invention provides an assembly having two pivotably coupled members and a cavity disposed therebetween. When disposed between a spring and an applied load, the members of the assembly pivot relative to one another to center the load on the spring.

Another embodiment of the present invention provides a method for automatically centering a load applied to a spring using a load-centering assembly disposed between the spring and the load.

Yet another embodiment of the present invention provides an assembly for centering the load applied to a spring which utilizes hydraulic pressure to automatically center the load.

Further objects, embodiments, forms, benefits, aspects, features and advantages of the present invention may be obtained from the present disclosure.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, and alterations and modifications in the illustrated device and method and further applications of the principles of the invention as illustrated therein, are herein contemplated as would normally occur to one skilled in the art to which the invention relates.

Figure 3:
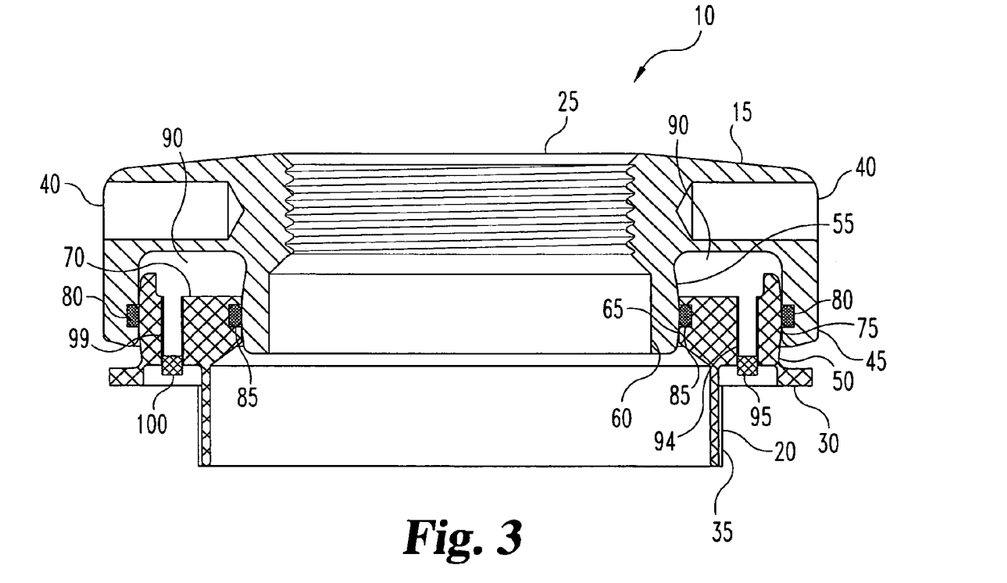
FIG. 3 is a partial cross-sectional view of a spring perch assembly according to one embodiment of the present invention.

FIG. 3 shows a partial cross-sectional view of a spring perch assembly 10 according to one preferred embodiment of the present invention. The perch assembly comprises a body portion 15 and a base portion 20. The body portion 15 includes an outer flange 45 having a straight inner wall 75 and an inner flange 60 having a curved outer wall 55. Optionally the body portion may also include one or more wrench sockets 40 and a central, threaded socket 25 for attachment to a load. For example, in a vehicle suspension system a shock absorber may be attached to the socket. The base 20 portion of the perch assembly includes an annular wall 70, a lateral flange 30 and a spring locating guide 35. The annular wall portion 70 of the base has a curved outer wall 50 and a straight inner wall 65. A less preferred alternative includes straight outer and inner walls for the body portion and base portions.

The body portion of the assembly is sized to receive the base portion such that outer surface 55 of the inner flange 60 of the body member has a slightly smaller diameter than the inner surface 65 of the annular wall 70 of the base member and such that the outer surface 50 of the annular wall 70 of the base member has a slightly smaller diameter than the inner wall 75 of the outer flange 45 of the body member. This allows the body member to freely pivot relative to the base member without disengaging the base member. In one embodiment of the present invention, the body member may pivot up to approximately 4° relative to the base member. The present invention also contemplates assemblies which allow a greater or lesser range of pivot between the body member and the base member.

Preferably, the inner and outer wall of the body member and the inner and outer wall of the base member are machined to a smooth finish to reduce friction. Optionally, these surfaces may be coated with a low-friction material to further reduce friction. This material may be applied in any suitable manner such as spraying, spray and bake, or as a dry film. Examples of suitable materials include Krytox® and Teflon® manufactured by DuPont, although other suitable materials may also be used.

When the base member 20 is engaged with the body member 15, the inner surface 65 of the annular base wall 70 engages the outer surface 55 of the inner body flange 60 and the inner surface 75 of the outer body flange 45 engages the outer surface 50 of the annular base wall 70. This forms a circular cavity 90 between the body portion and the base portion of the assembly. To ensure the cavity is tightly sealed, suitable seals, such as O-rings 80 and 85, may be disposed between the inner surface of the annular base wall and the outer surface of the inner body flange and between the inner surface of the outer body flange and the outer surface of the annular base wall. Optionally, these O-rings 80 and 85 may be impregnated or coated with a low-friction material such as Krytox®. As the outer wall 55 of the inner flange 60 of the body member and the outer wall 50 of the annular wall 70 of the base member are curved, they exert an even pressure across the face of the O-rings 80 and 85 as the body member is pivoted relative to the base member.

The cavity 90 may be filled with a volume of oil, hydraulic fluid or other suitable fluid through a fluid passage 94 in the base portion which is sealed using a screw 95. Air may be removed from the cavity during the filling process through an air bleed passage 99 which is sealed with a screw 100. Preferably, the cavity 90 is filled with a suitable fluid until the body member floats on the fluid without disengaging from the base member.

Figure 4:
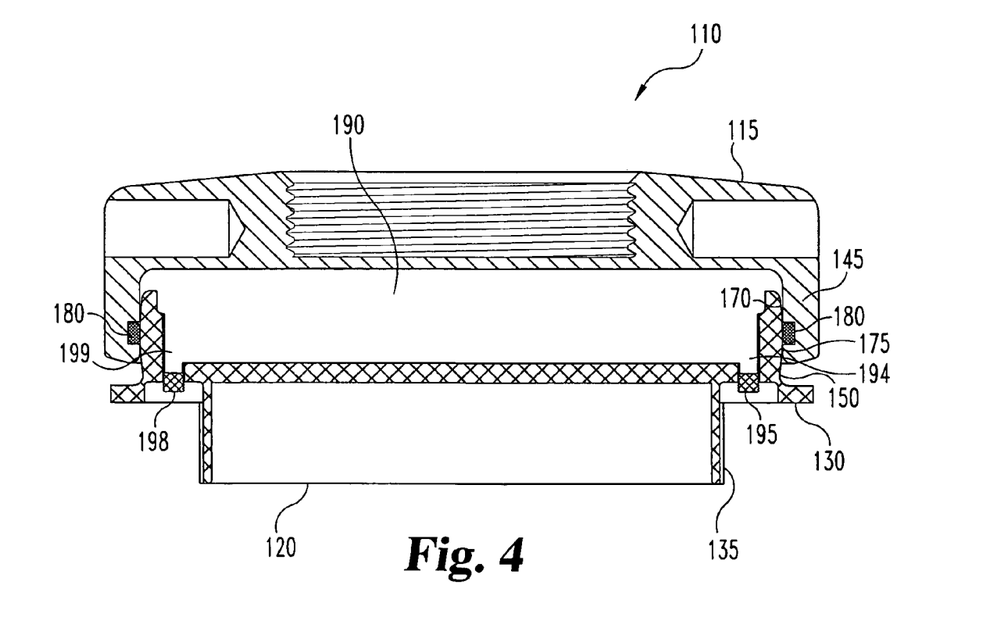
FIG. 4 is a partial cross-sectional view of a spring perch assembly according to another embodiment of the present invention.

FIG. 4 shows an alternate preferred embodiment of the present invention. In this embodiment, the body portion 115 of the assembly 110 includes an outer flange 145 having a straight inner wall 175. The base portion 120 of the assembly includes an annular wall 170 having a curved outer surface 150, a lateral flange 130 and a spring locating guide 135. The base and body portions of the assembly are sized such that the outer surface 150 of the annular wall 170 has a slightly smaller diameter than the inner surface 175 of the outer flange 145 of the body member. This allows body member 115 to freely pivot relative to the base member 120 without disengaging the base member.

When the base member is engaged with the body member, the inner surface 175 of the outer flange 145 engages the outer surface 150 of the annular base wall 170. This forms a cavity 190 between the body member and the base member. An O-ring 180 such as described in FIG. 3 may be positioned between the inner surface 175 of the body flange and the outer surface 150 of the annular base wall to ensure that the cavity 190 is tightly sealed. Optionally, the inner surface 175 of the body flange, the outer surface 150 of the annular base wall and the O-ring 180 may be coated with a low-friction material. This cavity 190 may be filled with a hydraulic fluid such as oil through a fluid passage 194 in the base portion which is sealed using a screw 195. Air may be removed from the cavity during the filling process through an air bleed passage 199 which is sealed with a screw 198. Operation of the embodiments described by FIGS. 3-4 will be described in greater detail with reference to FIGS. 7-8.

Figure 4A:
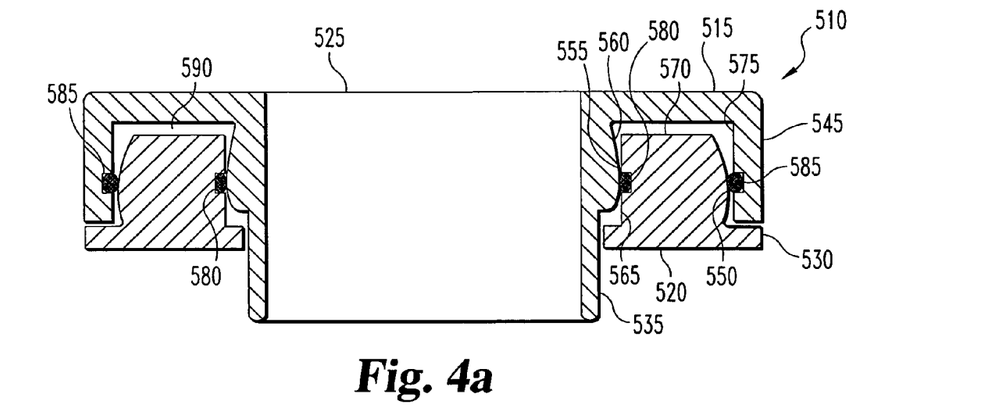
FIG. 4A is a partial cross-sectional view of another embodiment of a spring perch assembly according to the present invention

An alternate preferred embodiment of the present invention is shown in FIG. 4A. The perch assembly 510 comprises a body portion 515 and a base portion 520. The body portion 515 includes an outer flange 545 having a straight inner wall 575 and an inner flange 560 having a curved outer wall 555. The body portion 515 also includes a spring locating guide 535. Optionally the body portion may also include a central socket 525 for attachment to a load. The base 520 portion of the perch assembly includes an annular wall 570 and a lateral flange 530. The annular wall portion 570 of the base has a curved outer wall 550 and a straight inner wall 565. The body portion 515 of the assembly is sized to receive the base portion 520 such that outer surface 555 of the inner flange 560 of the body member has a slightly smaller diameter than the inner surface 565 of the annular wall 570 of the base member and such that the outer surface 550 of the annular wall 570 of the base member has a slightly smaller diameter than the inner wall 575 of the outer flange 545 of the body member. This allows the body member to freely pivot relative to the base member without disengaging the base member. In one embodiment of the present invention, the body member may pivot up to approximately 4° relative to the base member. The present invention also contemplates assemblies which allow a greater or lesser range of pivot between the body member and the base member.

Preferably, the inner and outer wall of the body member and the inner and outer wall of the base member are machined to a smooth finish to reduce friction. Optionally, these surfaces may be coated with a low-friction material to further reduce friction. This material may be applied in any suitable manner such as spraying, spray and bake, or as a dry film. Examples of suitable materials include Krytox® and Teflon® manufactured by DuPont, although other suitable materials may also be used.

When the base member 520 is engaged with the body member 515, the inner surface 565 of the annular base wall 570 engages the outer surface 555 of the inner body flange 560 and the inner surface 575 of the outer body flange 545 engages the outer surface 550 of the annular base wall 570. This forms a circular cavity 590 between the body portion and the base portion of the assembly. To ensure the cavity is tightly sealed, O-rings 580 and 585 may be disposed between the inner surface of the annular base wall and the outer surface of the inner body flange and between the inner surface of the outer body flange and the outer surface of the annular base wall. Optionally, these O-rings 580 and 585 may be impregnated or coated with a low-friction material such as Krytox®. This cavity 590 may be filled with a volume of oil, hydraulic fluid or other suitable fluid, preferably until the body member floats on the fluid without disengaging from the base member.

Figure 5:
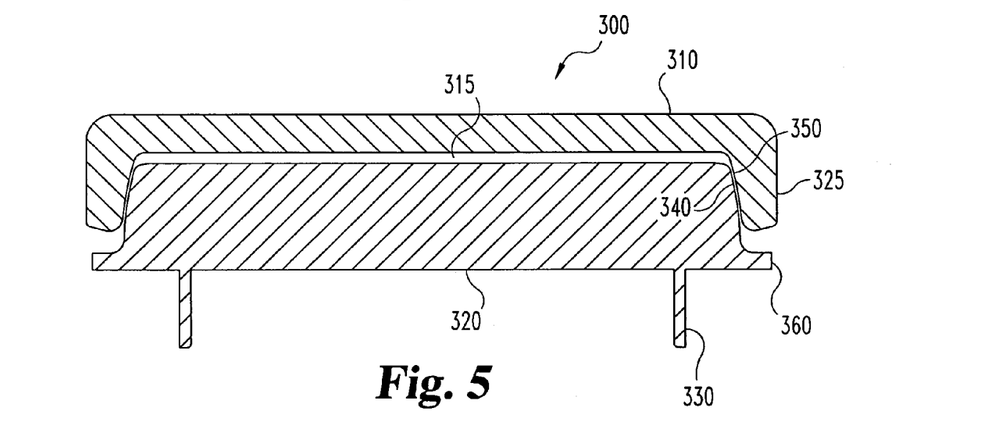
FIG. 5 is a partial cross-sectional view of a spring perch assembly according to another embodiment of the present invention.

An alternate preferred spring perch assembly is shown in FIG. 5. A means for connecting objects to this particular embodiment and the embodiment illustrated in FIG. 6 such as the threaded socket 25 described in FIG. 3 has been omitted for clarity. It is understood that suitable means for attaching objects such as shock absorbers to this particular embodiment is used. In this embodiment of the present invention, the assembly 300 includes a body portion 310 and a base portion 320. The base portion includes a lateral flange 360, a spring locating guide 330 and a curved outer wall 340. The body portion includes a flange 325 having a curved inner surface 350. The curve of the inner surface 350 of the body flange complements the curve of the outer wall 340 of the base portion. Preferably, this curve is approximately spherical. The center of this curve is preferably located a distance above or below the face of the engaged spring. The components of the assembly are sized such that the outer wall 340 of the base portion has a slightly smaller diameter than the inner surface 350 of the body flange and engage in substantially full contact, such that the centers of the curves are at substantially the same point in space. This allows the body portion of the assembly to pivot relative to the base portion without disengaging the base portion. In one embodiment of the invention, the outer wall of the base portion has a diameter of 1.374 inches and the inner wall of the body portion has a diameter of 1.375 inches. In one embodiment, the body portion 310 of the assembly may pivot up to approximately 4° relative to the base portion 320. The present invention also contemplates assemblies which allow a greater or lesser range of pivot between the body member and the base member.

Figure 6:
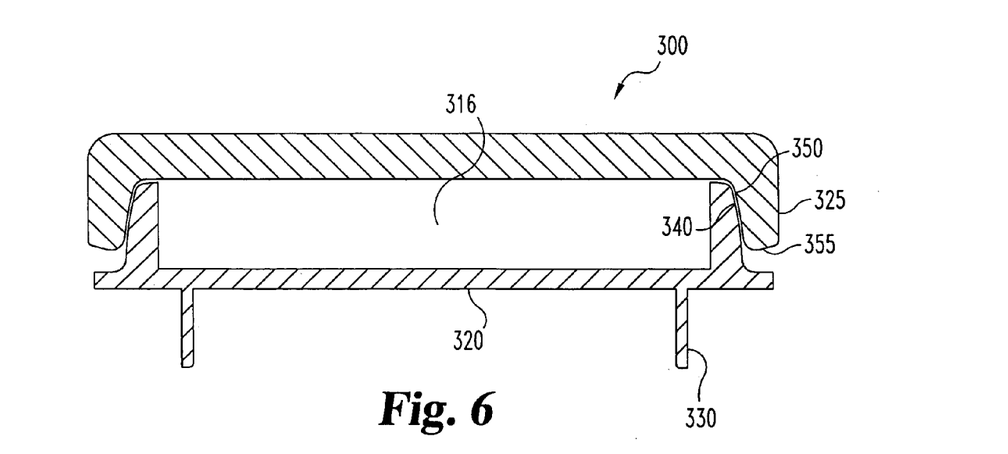
FIG. 6 is a partial cross-sectional view of a spring perch assembly according to yet another embodiment of the present invention.

Optionally, the outer wall 340 of the base portion and the inner surface 350 of the body flange may be coated or impregnated with a low-friction material. In this embodiment, when the body portion and the base portion are engaged, the inner surface of the body portion directly engages the outer wall of the base portion. This forms a cavity 315 between the base portion and the body portion of the assembly. Preferably the outer wall 340 of the base portion and the inner wall 350 of the body portion are machined smooth to minimize friction between the two surfaces. Also, it is preferred that these surfaces be coated with a low-friction material to further minimize friction. This material may be applied in any desired fashion. Examples of suitable materials include Krytox® and Teflon® manufactured by DuPont, although other suitable materials may also be used. An alternate embodiment of this assembly having a larger cavity 316 is shown in FIG. 6.

Figure 7:
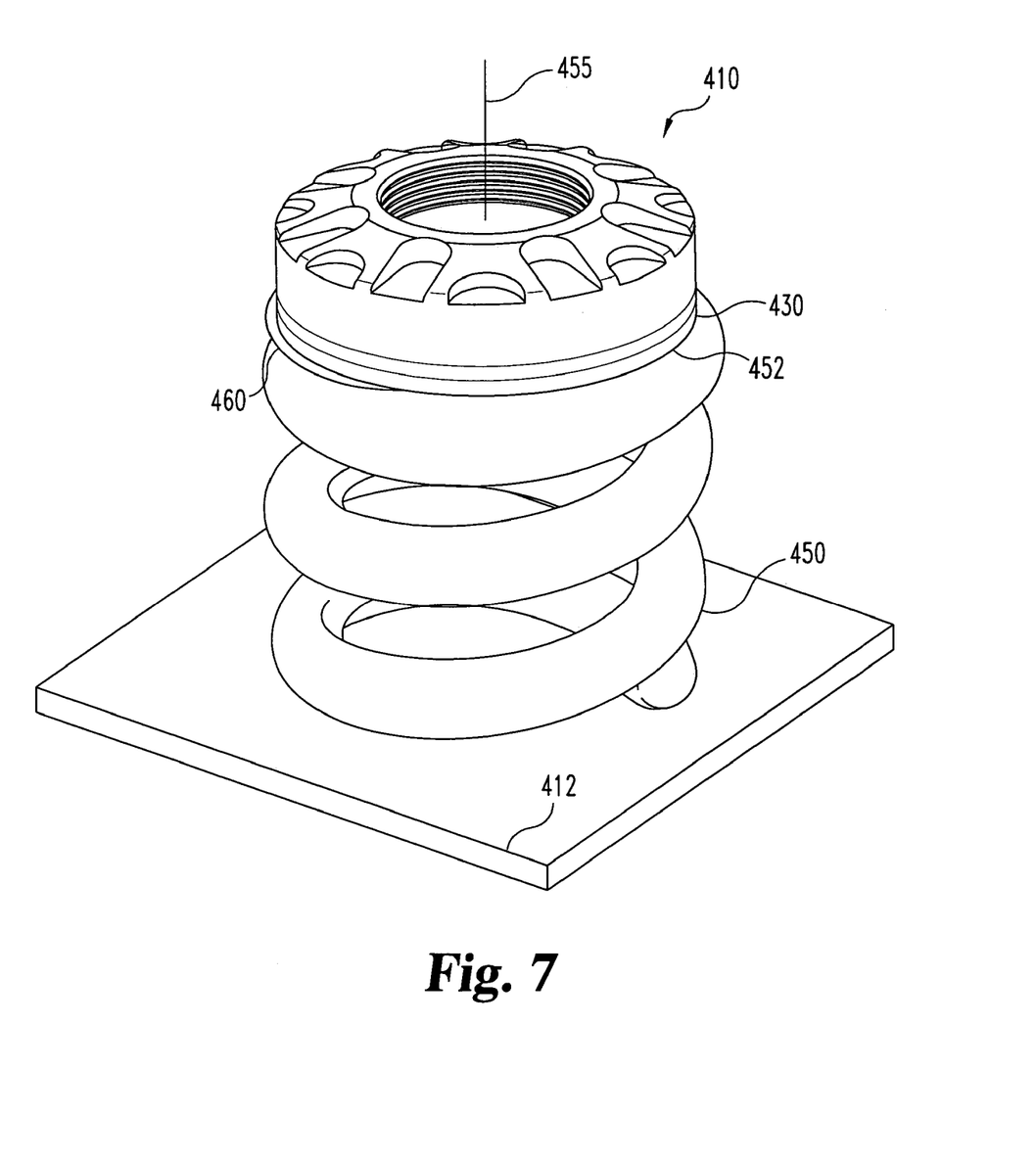
FIG. 7 is a perspective view of a spring according to one embodiment of the present invention.
Figure 8:
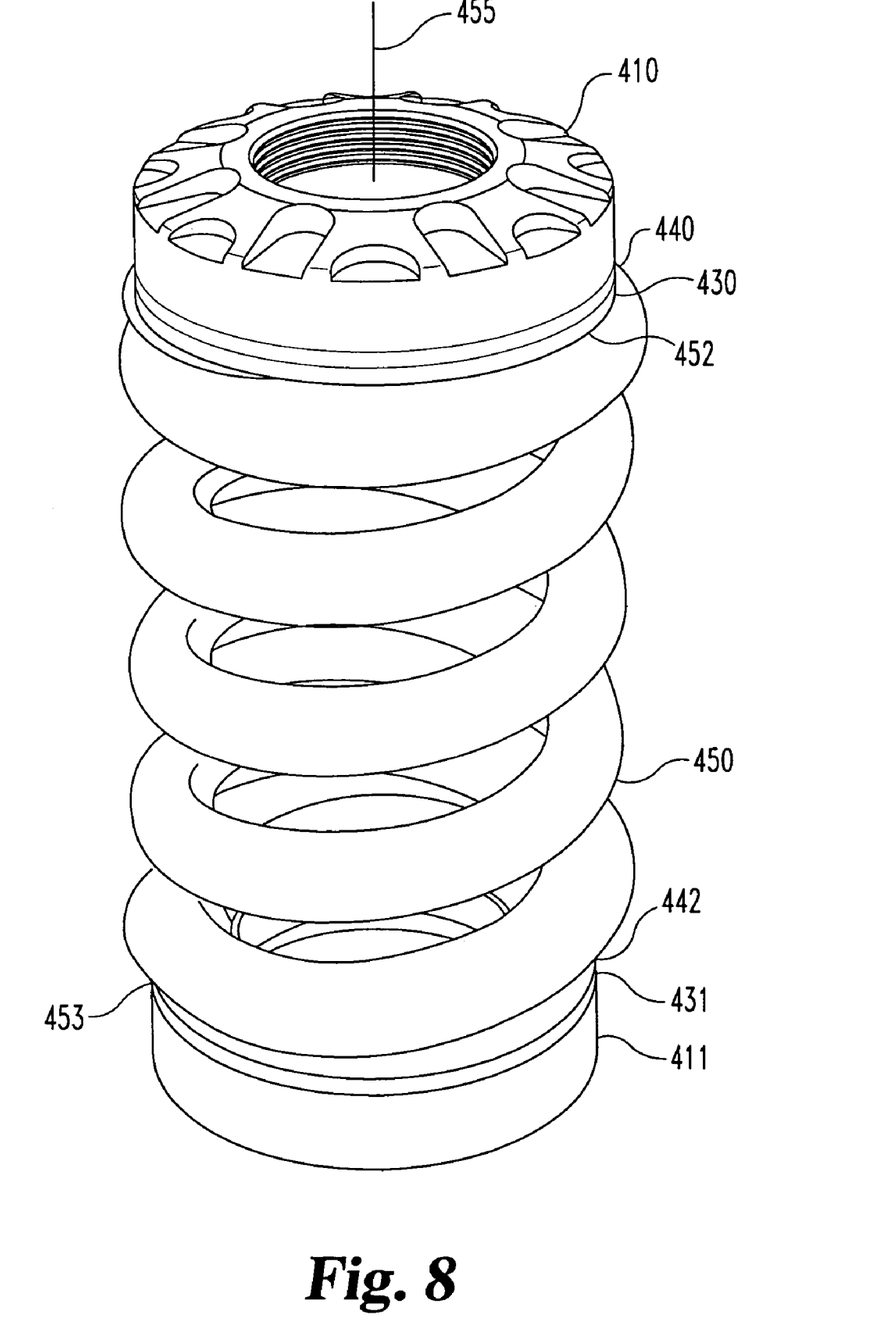
FIG. 8 is a perspective view of a spring according to another embodiment of the present invention.

FIG. 7 shows a spring perch assembly 410 according to one embodiment of the present invention engaged with a coil spring 450. The assembly is engaged with the spring 450 by inserting the spring locating guide (not shown) through the center of the spring coil until the upper surface of the coil 452 contacts the lateral flange 430 of the base portion of the assembly. The spring locating guide prevents lateral movement of the assembly relative to the spring. In this particular example, the end of the spring distal from the assembly is in contact with a fixed base 412. Although FIG. 7 shows a perch assembly engaged with the top of a spring, it is also contemplated by the present invention to use a single perch assembly engaged with the bottom of a spring. As seen in FIG. 8, a coil spring 450 may be engaged with one perch assembly 410, 411 at each end of the spring to further improve the load-centering performance of the present invention.

First, the operation of the embodiments of the present invention discussed previously in FIGS. 3-4 will be described with reference to FIG. 7. When a load is applied to the spring perch assembly body member, the load is initially is initially resisted by the spring reactive force at the point of first contact 460 between the spring and the perch assembly and transferred to the fluid in the cavity and then to the base member of the assembly. This causes the spring reactive force to initially be distributed unequally about the face of the spring end coil and base member. As the base member is free to pivot relative to the body member, the base member will tilt according to the shape and twisting strength of the end coil. This load concentration and tilting of the base member causes the hydraulic fluid in the cavity at that location to be compressed. This compression of the fluid forces a redistribution of the fluid throughout the cavity, and continues until the applied load is equally distributed about the face of the end coil of the spring, and is substantially in equilibrium to the spring reactive force, which is also spread evenly about the face of the spring end coil and therefore centralized along the natural centerline of the spring 455. Preferably, this minimizes and/or eliminates any lateral components of the spring reactive load. Preferably, the cavity and degree of tilt has sufficient clearance such that complete compression of the fluid, and complete transfer of the applied load through the hydraulic fluid and to the spring end coil before the base member comes in contact with the body portion of the assembly. Although tilting assists in redistribution, it will not redistribute the load with complete efficiency. Hydrostatic equilibrium within the fluid cavity completes the redistribution of the load evenly across the entire body portion of the assembly thereby maintaining the center of the applied load along the natural centerline 455 of the spring, thereby minimizing and/or eliminating any lateral components of the load. Although ideally minimized, residual friction between the body portion and the base portion prevents completely efficient redistribution.

Next, the operation of the embodiments of the present invention discussed previously in FIGS. 5-6 will be described with reference to FIG. 7. When a load is applied to the spring perch assembly body member, the spring reactive load is initially concentrated at the point of first contact 460 between the spring end coil and the perch assembly base member. This load concentration causes the base member of the assembly to pivot or tilt relative to the body portion, until the spring reactive force is in substantially complete equilibrium to the applied load at the face of the spring end coil. At this point, the spring reactive load is substantially concentrated along the natural centerline 455 of the spring, thereby minimizing and/or eliminating any lateral components of the spring lateral load. The degree to which the base member, and therefore the spring end coil, will tilt, may be affected by friction between the base member and the body member, and the twisting strength of the end coil. The minimization of friction enhances the equalization.

Additionally, the system can be made "self energizing" by changing the radius of curvature of the walls to move the center of rotation away from the spring face and away from the body of the spring. While this introduces a slight lateral buckling effect, it has been found that moving the center of rotation upward, away from the spring can increase the tilting efficiency in overcoming friction between the base and body members, and thus enhances the load equalization. This benefit is limited by the effect of the lateral movement of the spring end and natural centerline 455 off of a centered position, which results in the final spring reactive force being placed slightly off center of the perch assembly.

As seen in FIG. 8 a spring 450 may be engaged with two assemblies 410, 411 according to the present invention. In this example, a first assembly 410 is engaged to a first end 452 of the spring 450 and a second assembly 411 is engaged to a second end 442 of the spring 450. The first assembly 410 is engaged with the spring 450 by inserting the spring locating guide (not shown) through the center of the spring coil until the upper surface 440 of the first end coil 452 contacts the lateral flange 430 of the base portion of the assembly 410. The spring locating guide prevents lateral movement of the assembly relative to the spring. Similarly, the second assembly 411 is engaged with the spring 450 by inserting the spring locating guide (not shown) through the center of the spring coil until the lower surface of the second end 442 of the spring 453 contacts the lateral flange 431 of the base portion of the assembly 411.

Figure 9A:
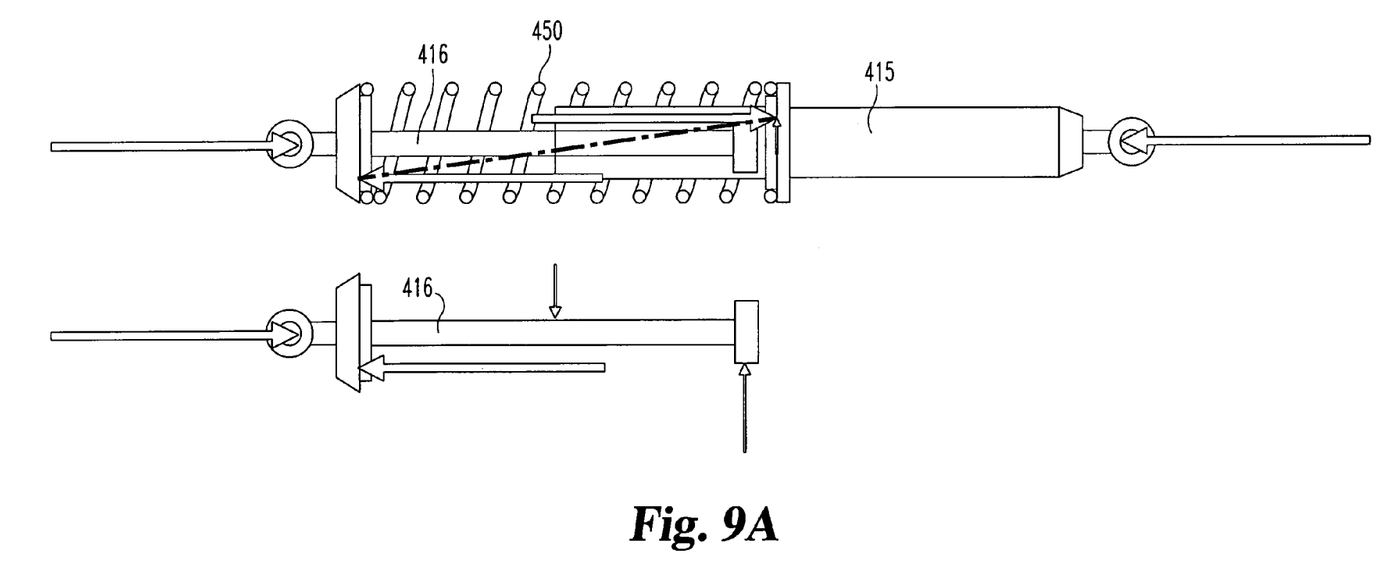
FIG. 9A illustrates a spring engaged directly with a suspension member having a cylinder and a piston.
Figure 9B:
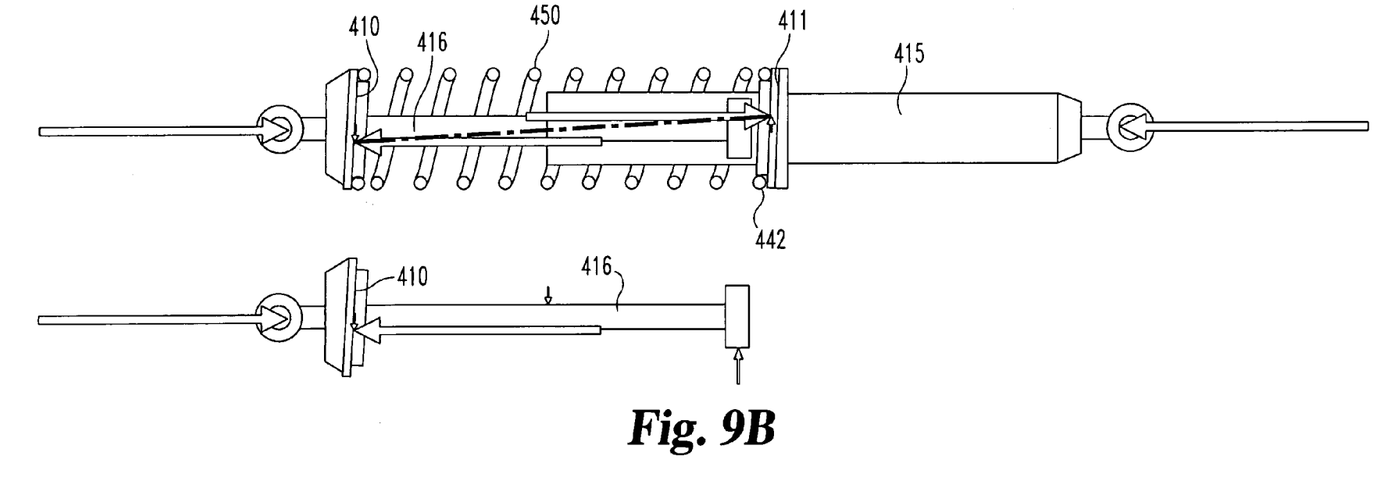
FIG. 9B illustrates a spring engaged to a suspension member having a cylinder and a piston, augmented with two perch assemblies.

FIG. 9A illustrates a spring 450 engaged directly with a suspension member having a cylinder 415 and piston 416. Vector arrows illustrate the longitudinal and side-loading forces on the piston. FIG. 9B, illustrates spring 450 engaged to a suspension member having a cylinder 415 and piston 416, augmented with two perch assemblies 410 and 411. Assembly 410 engages first spring end 452, and assembly 411 engages second spring end 442. Vector arrows illustrate the longitudinal and side-loading forces on the piston in FIG. 9B, and demonstrate the reduced offset load resulting from use of the spring perches.

Figure 10:
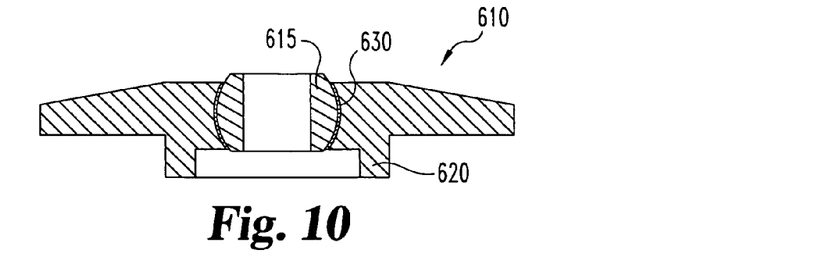
FIG. 10 illustrates a spring perch according to an alternate preferred embodiment of the invention.

FIG. 10 illustrates a perch 610 according to an alternate preferred embodiment of the invention. In this embodiment, a substantially spherical monoball or bearing 615 is mounted in engagement with a base 620. As illustrated, the base engages lateral or side portions of the bearing, and extends above and below the bearing's largest horizontal diameter. Base 620 is shaped to accept a spring. Optionally, a liner 630 can be placed between the bearing and base. The liner, for example, can be made with a teflon or brass.

Figure 11A:
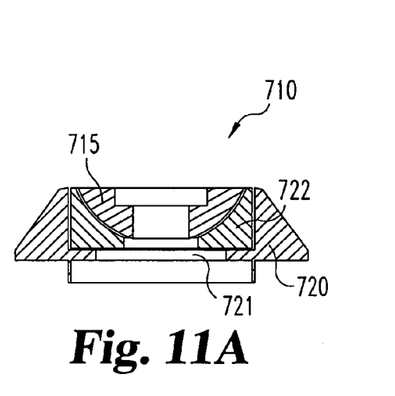
FIGS. 11A and 11B illustrate an embodiment of a perch in a cross-sectional view and a bottom view.
Figure 11B:
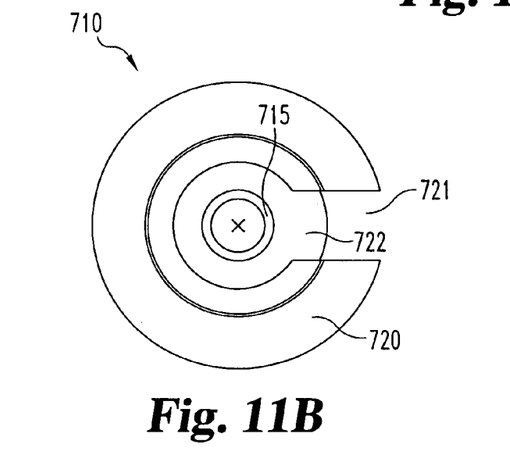

FIGS. 11A and 11B, illustrate an embodiment of a perch 710 in a cross-sectional view and a bottom view. Perch 710 includes three pieces, a sphere portion 715, a base 722 and a retaining collar 720. The retaining collar 720, that engages the spring is removable by moving it downwards from the base 722. Collar 720 defines a slot 721 cut into it to facilitate removal across a shaft.

The orientation of the sphere in FIGS. 11A and 11B can alternately be reversed,—i.e., the spherical surface faces the opposite direction. Optionally, the sphere can be made with the base integral to the collar, instead of separate pieces. The three-piece split collar design could also be made similar to perch 610, with the sphere portion forming an almost complete ball.

Figure 12A:
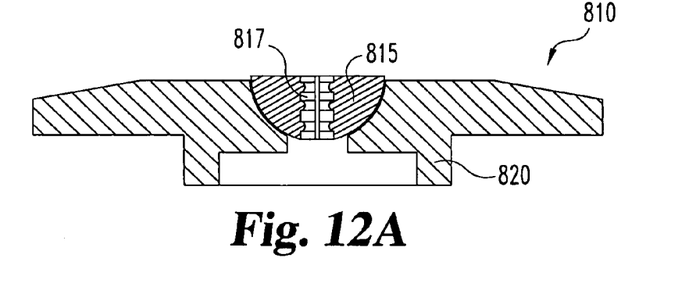
FIGS. 12A and 12B illustrate arrangements for a spring perch attachment to an engine valve stem.
Figure 12B:
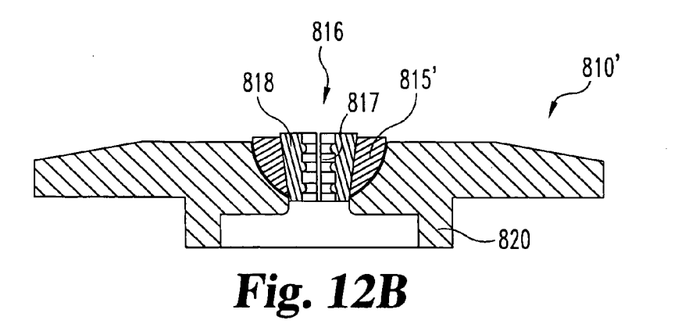

FIGS. 12A and 12B illustrate arrangements for a spring perch attachment to an engine valve stem. In perch 810 of FIG. 12A, a spherical ball portion 815 is split into two pieces. Rings and grooves 817 in the ball halves engage the valve stem. Perch 810 includes base 820.

Perch 810' of FIG. 12B, illustrates a version with the ball portion 815' in one piece. A hole 816 passes through the center of ball portion 815' and preferably is cut as a taper to match the cone shape of a typical valve stem retainers 818 (sometimes called "chiclets" or "wedges"). Rings and grooves 817 in the valve stem retainer engage the valve stem.

A series of tests were performed to measure the reduction of lateral forces provided by spring perch assemblies according to several embodiments of the present invention. During the tests, various loads were applied to a test spring and the resulting lateral force measured. The test spring measured 4 inches long and 2.25 inches inside diameter with a spring constant of 500 pounds per inch. Subsequently, spring perch assemblies according to the embodiment of the present invention depicted in FIG. 3 (Type 3) and in FIG. 4A (Type 4A) were employed in combination with the test spring during the testing procedure. The results of these tests are summarized in the following chart:

|  | Lateral Force (lbs.) | | | |
| --- | --- | --- | --- | --- |
|  | Load (lbs.) 222 | Load (lbs.) 376 | Load (lbs.) 532 | Load (lbs.) 695 |
| Spring only | 116 | 233 | 402 | 571 |
| Type 3 on top | 59 | 91 | 166 | 313 |
| Type 3 on bottom | 61 | 98 | 151 | 240 |
| Type 3 on top and bottom | 7 | 10 | 21 | 50 |
| Type 4A on top | 68 | 174 | 337 | 514 |
| Type 4A on bottom | 62 | 148 | 306 | 466 |
| Type 4A on top and bottom | 40 | 140 | 303 | 482 |
| Type 4A on top, Type 3 on bottom | 26 | 55 | 100 | 191 |
| Type 3 on top, Type 4A on bottom | 43 | 70 | 156 | 295 |

As can been seen in the chart, the greatest reduction in lateral force over that experienced by the spring alone was achieved by employing perch assemblies of the type shown in FIG. 3 at the top and bottom of the spring. This resulted in a 98% reduction in lateral force in the spring at an applied load of 376 pounds and a 96% reduction at an applied load of 532 pounds. While employing two perch assemblies clearly leads to the greatest reduction in lateral force, significant reductions were also achieved using a single perch assembly. For example, the use of a single Type 3 assembly on top of the test spring resulted in a 61% reduction in lateral force with an applied load of 376 pounds while a single Type 4 assembly on top of the test spring produced a 25% reduction using the same applied load.

While the invention has been illustrated and described in detail in the drawings and foregoing description, the same is to be considered as illustrative and not restrictive in character, it being understood that only the preferred embodiment have been shown and described and that all changes and modifications that come within the spirit of the invention are desired to be protected. The articles "a", "an", "said" and "the" are not limited to a singular element, and include one or more such element.

What is claimed is:

1. A load-centering perch assembly engaging an end coil of a coil spring, comprising:

a base member engaged with the end coil of a coil spring having a natural centerline, wherein said base member is tiltable with said end coil relative to a natural centerline of the spring during spring compression;

a body member for receiving a load having a substantially fixed load direction, wherein said body member is in substantially fixed alignment with the load;

wherein said body member and said base member are pivotally engaged;

wherein during spring compression said base member tilts with the spring end coil relative to said spring natural centerline and pivots with respect to said body member to redistribute the applied load across the spring end coil;

wherein body member and said base member define a cavity therebetween, wherein said cavity is filled with a substantially incompressible hydraulic fluid; and, wherein said cavity is sealed with at least one O-ring seal and wherein said hydraulic fluid and said at least one O-ring seal cooperate to cause said base member and said body member to float with respect to said body member and said base member such that said base member is spaced apart from said body member.

2. The assembly of claim 1 wherein said body member has a curved portion engaging a complimentary curved portion of said base member.

3. The assembly of claim 2 wherein said body member curved portion and said base member curved portion are spherically curved.

4. The assembly of claim 1 wherein said cavity is annular in shape.

5. The assembly of claim 1 wherein said cavity is circular in shape.

6. The assembly of claim 1 wherein engaging portions of said body member and said base member are coated with a low-friction material.

7. The assembly of claim 1 wherein said body member has a curved portion engaging a straight portion of said base member.

8. The assembly of claim 1 wherein said body member has a straight portion engaging a curved portion of said base member.

9. The assembly of claim 1 wherein said body member has two portions engaging two corresponding portions of said base member to define said cavity.

10. A load-centering perch assembly for engaging a coil spring comprising:

a base member engaged and tiltable with an end coil of a coil spring relative to a natural centerline of the spring;

a body member engaged with a fixed direction load and having a fixed load centerline;

whereby said body member and said base member are pivotally engaged with a cavity separating said body member from said base member, such that said base member tilts with the end coil of the spring relative to the spring centerline and pivots relative to said body member during spring compression;

wherein said cavity is filled with a substantially incompressible; and, wherein said fluid and said cavity cooperate to cause said base member to float with respect to said body member such that said base member is spaced apart from said body member.

11. The assembly of claim 10 wherein said cavity is sealed with at least one O-ring seal.

12. The assembly of claim 11 wherein said fluid is a hydraulic fluid.

13. The assembly of claim 12 wherein said cavity is circular in shape.

14. The assembly of claim 12 wherein said cavity is annular in shape.

15. The assembly of claim 10 wherein said body member has a curved engaging portion complimenting a curve of an engaging portion of said base member.

16. A load-centering perch assembly for a coil spring in a vehicle suspension system, comprising:

a base member engaging an end coil of a spring having a natural centerline;

a body member having a fixed load direction attached to a vehicle suspension shock absorber;

wherein said body member and said base member are pivotally engaged with a cavity separating said base member from said body member and wherein said cavity is filled with an hydraulic fluid;

wherein said base member is tiltable with the end coil of the spring relative to the natural centerline of the spring and pivots relative to the fixed load direction and said body member during spring compression; and wherein said fluid and said cavity cooperate to cause said base member to float with respect to said body member such that said base member is spaced apart from said body member.

* * * * *